United States Patent
Christopher et al.

(10) Patent No.: US 10,834,586 B2
(45) Date of Patent: Nov. 10, 2020

(54) SYSTEM AND METHOD FOR CONTROLLING HETEROGENEOUS INTERNET OF THINGS (IOT) DEVICES USING SINGLE APPLICATION

(71) Applicant: AMZETTA TECHNOLOGIES, LLC, Norcross, GA (US)

(72) Inventors: Samvinesh Christopher, Suwanee, GA (US); Joseprabu Inbaraj, Suwanee, GA (US); Chandrasekar Rathineswaran, Duluth, GA (US)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 506 days.

(21) Appl. No.: 15/223,146

(22) Filed: Jul. 29, 2016

(65) Prior Publication Data

US 2018/0034914 A1   Feb. 1, 2018

(51) Int. Cl.

| | |
|---|---|
| *H04W 12/06* | (2009.01) |
| *H04L 29/06* | (2006.01) |
| *H04L 29/08* | (2006.01) |
| *H04W 4/70* | (2018.01) |
| *H04W 8/00* | (2009.01) |
| *H04W 60/04* | (2009.01) |

(52) U.S. Cl.
CPC ............ *H04W 12/06* (2013.01); *H04L 67/16* (2013.01); *H04L 67/322* (2013.01); *H04L 69/08* (2013.01); *H04L 69/18* (2013.01); *H04W 4/70* (2018.02); *H04W 8/005* (2013.01); *H04W 60/04* (2013.01)

(58) Field of Classification Search
CPC ....... H04W 12/06; H04W 4/70; H04W 8/005; H04W 60/04; H04L 67/16; H04L 69/08; H04L 69/18
USPC ........................................................ 709/221
See application file for complete search history.

(56) References Cited

U.S. PATENT DOCUMENTS

| | | | |
|---|---|---|---|
| 9,210,534 B1 * | 12/2015 | Matthieu | ............... H04W 4/005 |
| 9,491,571 B2 * | 11/2016 | Karp | ...................... G05B 15/02 |
| 9,866,637 B2 * | 1/2018 | Doraiswamy | ....... H04L 41/0806 |
| 10,057,382 B2 * | 8/2018 | Sathyadevan | ........... H04W 4/70 |
| 2001/0034754 A1 | 10/2001 | Elwahab et al. | |

(Continued)

*Primary Examiner* — Nicholas R Taylor
*Assistant Examiner* — Chong G Kim
(74) *Attorney, Agent, or Firm* — Locke Lord LLP; Tim Tingkang Xia, Esq.

(57) ABSTRACT

Certain aspects direct to systems and methods for controlling heterogeneous internet of things (IoT) devices. The system includes a gateway device, which is communicatively connected to a control device under a first protocol and to multiple authenticated IoT devices under corresponding protocols. In operation, the gateway device receives a command from the control device, which is directed to a selected IoT device. Based on the command, the gateway device may select a corresponding API, and determine the corresponding network and the corresponding protocol specific for the selected IoT device. To send the command to the selected IoT device, the gateway device first determines whether the corresponding protocol for the selected IoT device is different from the first protocol. If so, the gateway device converts the command to a second command transmittable under the corresponding protocol for the selected IoT device, and sends the converted command to the selected IoT device.

21 Claims, 9 Drawing Sheets

(56) References Cited

U.S. PATENT DOCUMENTS

| | | | |
|---|---|---|---|
| 2007/0280206 A1* | 12/2007 | Messer | H04L 12/66 370/352 |
| 2008/0184030 A1 | 7/2008 | Kelly et al. | |
| 2013/0103221 A1 | 4/2013 | Raman et al. | |
| 2014/0098247 A1* | 4/2014 | Rao | H04W 4/20 348/207.1 |
| 2014/0175875 A1* | 6/2014 | Newman, Jr. | H04L 69/18 307/18 |
| 2015/0019710 A1* | 1/2015 | Shaashua | H04W 4/70 709/224 |
| 2015/0199610 A1* | 7/2015 | Hershberg | H04W 4/70 706/12 |
| 2015/0249642 A1* | 9/2015 | Burns | H04L 12/66 726/4 |
| 2015/0249672 A1 | 9/2015 | Burns et al. | |
| 2015/0256337 A1* | 9/2015 | Nguyen | H04W 4/70 713/171 |
| 2015/0296022 A1* | 10/2015 | Kim | H04L 67/12 709/203 |
| 2015/0319046 A1* | 11/2015 | Plummer | H04L 12/2834 715/736 |
| 2015/0347114 A1* | 12/2015 | Yoon | H04L 12/2832 235/375 |
| 2016/0007288 A1* | 1/2016 | Samardzija | H04W 52/0229 370/311 |
| 2016/0036819 A1* | 2/2016 | Zehavi | H04W 4/70 726/4 |
| 2016/0065653 A1* | 3/2016 | Chen | H04L 67/34 715/735 |
| 2016/0072670 A1* | 3/2016 | Matthieu | H04L 67/12 709/204 |
| 2016/0073482 A1* | 3/2016 | Fok | H05B 47/19 315/294 |
| 2016/0105292 A1* | 4/2016 | Choi | H04L 12/1818 709/206 |
| 2016/0205078 A1* | 7/2016 | James | H04L 63/0442 713/171 |
| 2016/0205106 A1* | 7/2016 | Yacoub | H04L 61/1511 726/28 |
| 2016/0226674 A1* | 8/2016 | Kangshang | G06F 3/0481 |
| 2016/0226732 A1 | 8/2016 | Kim et al. | |
| 2016/0261465 A1* | 9/2016 | Gupta | H04L 41/14 |
| 2016/0301739 A1* | 10/2016 | Thompson | G06F 9/541 |
| 2017/0026488 A1* | 1/2017 | Hao | H04L 67/32 |
| 2017/0041388 A1 | 2/2017 | Tal et al. | |
| 2017/0048079 A1* | 2/2017 | Nethi | H04L 12/2836 |
| 2017/0054810 A1* | 2/2017 | Evans | H04L 67/12 |
| 2017/0063611 A1* | 3/2017 | Sheba | H04L 41/0803 |
| 2017/0093915 A1 | 3/2017 | Ellis et al. | |
| 2017/0094033 A1* | 3/2017 | Sathyadevan | H04L 67/2823 |
| 2017/0126809 A1* | 5/2017 | Chen | H04L 67/125 |
| 2017/0168777 A1* | 6/2017 | Britt | G06F 8/20 |
| 2017/0185383 A1* | 6/2017 | Sarkar | G06F 8/20 |
| 2017/0201585 A1* | 7/2017 | Doraiswamy | H04L 41/0806 |
| 2017/0230461 A1* | 8/2017 | Verma | H04L 12/2803 |
| 2017/0230511 A1* | 8/2017 | Kim | H04M 11/007 |
| 2017/0279894 A1* | 9/2017 | Chen | H04L 69/18 |
| 2017/0371937 A1* | 12/2017 | Shah | G06F 8/71 |
| 2017/0374560 A1 | 12/2017 | Judge et al. | |
| 2018/0007058 A1 | 1/2018 | Zou et al. | |
| 2018/0034655 A1* | 2/2018 | Christopher | H04L 12/283 |
| 2018/0239316 A1* | 8/2018 | Toscano | G05B 15/02 |
| 2018/0351763 A1* | 12/2018 | Ock | H04L 12/2836 |

\* cited by examiner

SYSTEM AND METHOD FOR CONTROLLING HETEROGENEOUS INTERNET OF THINGS (IOT) DEVICES USING SINGLE APPLICATION

CROSS-REFERENCE TO RELATED APPLICATIONS

This application relates to co-pending U.S. patent application Ser. No. 15/223,177, entitled "SYSTEM AND METHOD FOR DEFINING INTERACTIONS BETWEEN INTERNET OF THINGS (IOT) DEVICES USING GRAPHIC USER INTERFACE (GUI) BASED TOOL" and filed on Jul. 29, 2016. The entire content of the above identified applications are incorporated herein by reference.

FIELD

The present disclosure relates generally to internet of things (IoT) technology, and more particularly to systems and methods for controlling heterogeneous IoT devices using a single application.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internet of things (IoT) is a relatively new developing technology. Currently, IoT devices do not have any common standards regarding the physical communication, protocol, application program interface (API) and user interface, and every IoT vendor has its own proprietary implementation of the IoT device. If a user has multiple IoT devices from different vendors and attempts to control the IoT devices from a mobile device, such as a smartphone, the user must install multiple mobile applications (apps) on the smartphone, with each app having a different user interface and a different mechanism to control the corresponding IoT device. This becomes complex and cumbersome for the user when more and more IoT devices are introduced to the user environment.

Therefore, an unaddressed need exists in the art to address the aforementioned deficiencies and inadequacies.

SUMMARY

Certain aspects of the disclosure direct to a system, which includes a control device and a gateway device. The gateway device is communicatively connected to the control device through a first network under a first protocol, and communicatively connected to a plurality of authenticated internet of things (IoT) devices, wherein each of the authenticated IoT devices is communicatively connected to the gateway device through a corresponding network under a corresponding protocol. In certain embodiments, the gateway device includes a processor and a storage device storing computer executable code. The computer executable code, when executed at the processor, is configured to: receive, from the control device through the first network under the first protocol, a first command directed to a selected IoT device of the plurality of authenticated IoT devices; select, from a plurality of application program interfaces (APIs), a corresponding API specific for the selected IoT device, and determine the corresponding network and the corresponding protocol for the selected IoT device; when the corresponding protocol for the selected IoT device is different from the first protocol, convert the first command to a second command transmittable under the corresponding protocol for the selected IoT device, and send the second command to the selected IoT device using the corresponding API through the corresponding network under the corresponding protocol; and when the corresponding protocol for the selected IoT device is identical to the first protocol, send the first command to the selected IoT device using the corresponding API through the corresponding network under the corresponding protocol.

In certain embodiments, the control device is a mobile device storing an IoT control application which, when executed at a processor of the mobile device, is configured to: provide a user interface to display information of the authenticated IoT devices; in response to receiving an input corresponding to the selected IoT device, generate, based on the input, the first command directed to the selected IoT device; and send the first command to the gateway device through the first network under the first protocol.

In certain embodiments, the computer executable code includes: a data store storing information of the control device, configuration data of the authenticated IoT devices and the plurality of APIs, wherein the information of the control device comprises information of the first network and the first protocol specific for the control device, and for each of the authenticated IoT devices, the configuration data comprises the corresponding API, the corresponding network and the corresponding protocol specific for the authenticated IoT device; and a processing module, configured to: receive, from the control device through the first network under the first protocol, the first command directed to the selected IoT device; retrieve, based on the first command, the configuration data of the selected IoT device from the data store; based on the configuration data of the selected IoT device, select, from the APIs, the corresponding API specific for the selected IoT device, and determine the corresponding network and the corresponding protocol for the selected IoT device; when the corresponding protocol for the selected IoT device is different from the first protocol, convert the first command to the second command, and send the second command to the selected IoT device using the corresponding API through the corresponding network under the corresponding protocol; and when the corresponding protocol for the selected IoT device is identical to the first protocol, send the first command to the selected IoT device using the corresponding API through the corresponding network under the corresponding protocol. In certain embodiments, the processing module is further configured to: receive, from a designated IoT device of the authenticated IoT devices, a first signal directed to the control device through the corresponding network under the corresponding protocol for the designated IoT device; retrieve, based on the first signal, the configuration data of the designated IoT device from the data store; select, based on the configuration data of the designated IoT device, the corresponding API specific for the designated IoT device from the APIs stored in the data store, and process the first signal by the corresponding API specific for the designated IoT device; convert the first signal to a second signal transmittable under the first protocol; and send the second signal to the control device through the first network under the first protocol.

In certain embodiments, the IoT control application, when executed at the processor of the mobile device, is further configured to: receive the second signal from the gateway device; and display, based on the second signal, information corresponding to the designated IoT device on the user interface.

In certain embodiments, the first signal is a response signal in response to a command being sent from the gateway device to the designated IoT device.

In certain embodiments, the computer executable code further includes: a discovery module configured to perform at least one discovery operation for available IoT devices; and an authentication module configured to: in response to discovery of a new IoT device, generate an notification corresponding to the new IoT device being discovered, and send the notification to the control device through the first network under the first protocol; receive, from the control device through the first network under the first protocol, an approval command to approve authentication of the new IoT device being discovered, or a rejection command to reject authentication of the new IoT device being discovered; and in response to receiving the approval command to approve authentication of the new IoT device being discovered, store information of the corresponding API, the corresponding network and the corresponding protocol specific for the new IoT device being discovered in the data store as the configuration data of the new IoT device being discovered, and authenticate the new IoT device being discovered to become one of the authenticated IoT devices.

In certain embodiments, the IoT control application, when executed at the processor of the mobile device, is further configured to: receive the notification corresponding to the new IoT device being discovered from the gateway device; display, based on the notification, information corresponding to the new IoT device being discovered on the user interface; and in response to receiving an input corresponding to the new IoT device to approve or reject the authentication of the new IoT device being discovered, generate, based on the input, the approval command or the rejection command, and send the approval command or the rejection command to the gateway device.

In certain embodiments, the gateway device further includes a plurality of network interfaces, wherein each of the network interfaces is operational under one of the first protocol or the corresponding protocols for the authenticated IoT devices.

In certain embodiments, the first network is a Wi-Fi network.

Certain aspects of the disclosure direct to a method for controlling heterogeneous internet of things (IoT) devices from a control device, which includes: providing a gateway device communicatively connected to the control device through a first network under a first protocol, and communicatively connected to a plurality of authenticated IoT devices, wherein each of the authenticated IoT devices is communicatively connected to the gateway device through a corresponding network under a corresponding protocol; receiving, at the gateway device, a first command from the control device through the first network under the first protocol, wherein the first command is directed to a selected IoT device of the authenticated IoT devices; selecting, at the gateway device, a corresponding application program interface (API) specific for the selected IoT device from a plurality of APIs, and determining the corresponding network and the corresponding protocol for the selected IoT device; when the corresponding protocol for the selected IoT device is different from the first protocol, converting, by the gateway device, the first command to a second command transmittable under the corresponding protocol for the selected IoT device, and sending the second command from the gateway device to the selected IoT device using the corresponding API through the corresponding network under the corresponding protocol; and when the corresponding protocol for the selected IoT device is identical to the first protocol, sending the first command from the gateway device to the selected IoT device using the corresponding API through the corresponding network under the corresponding protocol.

In certain embodiments, the control device is a mobile device storing an IoT control application which, when executed at a processor of the mobile device, is configured to: provide a user interface to display information of the authenticated IoT devices; in response to receiving an input corresponding to the selected IoT device, generate, based on the input, the first command directed to the selected IoT device; and send the first command to the gateway device through the first network under the first protocol.

In certain embodiments, the method further includes: receiving, at the gateway device, a first signal from a designated IoT device of the authenticated IoT devices through the corresponding network under the corresponding protocol for the designated IoT device, wherein the first signal is directed to the control device; retrieving, by the gateway device based on the first signal, configuration data of the designated IoT device from a data store; selecting, by the gateway device based on the configuration data of the designated IoT device, the corresponding API specific for the designated IoT device from the APIs stored in the data store, and processing the first signal by the corresponding API specific for the designated IoT device; converting, by the gateway device, the first signal to a second signal transmittable under the first protocol; and sending the second signal from the gateway device to the control device through the first network under the first protocol.

In certain embodiments, the IoT control application, when executed at the processor of the mobile device, is further configured to: receive the second signal from the gateway device; and display, based on the second signal, information corresponding to the designated IoT device on the user interface.

In certain embodiments, the method further includes: performing, by the gateway device, at least one discovery operation for available IoT devices; in response to discovery of a new IoT device, generating, by the gateway device, an notification corresponding to the new IoT device being discovered, and sending the notification from the gateway device to the control device through the first network under the first protocol; receiving, by the gateway device, an approval command to approve authentication of the new IoT device being discovered, or a rejection command to reject authentication of the new IoT device being discovered from the control device through the first network under the first protocol; and in response to receiving the approval command to approve authentication of the new IoT device being discovered, storing information of the corresponding API, the corresponding network and the corresponding protocol specific for the new IoT device being discovered in a data store as configuration data of the new IoT device being discovered, and authenticating the new IoT device being discovered to become one of the authenticated IoT devices.

In certain embodiments, the IoT control application, when executed at the processor of the mobile device, is further configured to: receive the notification corresponding to the new IoT device being discovered from the gateway device; display, based on the notification, information corresponding to the new IoT device being discovered on the user interface; and in response to receiving an input corresponding to the new IoT device to approve or reject the authentication of the new IoT device being discovered, generate, based on the input, the approval command or the rejection command, and send the approval command or the rejection command to the gateway device.

Certain aspects of the disclosure direct to a non-transitory computer readable medium storing computer executable code. In certain embodiments, the computer executable code, when executed at a processor of a gateway device, is configured to: receive, from a control device through a first network under a first protocol, a first command directed to a selected internet of things (IoT) device of a plurality of authenticated IoT devices, wherein the gateway device is communicatively connected to the control device through the first network under the first protocol, and communicatively connected to the plurality of authenticated IoT devices, wherein each of the authenticated IoT devices is communicatively connected to the gateway device through the corresponding network under the corresponding protocol; select, from a plurality of application program interfaces (APIs), a corresponding API specific for the selected IoT device, and determine the corresponding network and the corresponding protocol for the selected IoT device; when the corresponding protocol for the selected IoT device is different from the first protocol, convert the first command to a second command transmittable under the corresponding protocol for the selected IoT device, and send the second command to the selected IoT device using the corresponding API through the corresponding network under the corresponding protocol; and when the corresponding protocol for the selected IoT device is identical to the first protocol, send the first command to the selected IoT device using the corresponding API through the corresponding network under the corresponding protocol.

In certain embodiments, the control device is a mobile device storing an IoT control application which, when executed at a processor of the mobile device, is configured to: provide a user interface to display information of the authenticated IoT devices; in response to receiving an input corresponding to the selected IoT device, generate, based on the input, the first command directed to the selected IoT device; and send the first command to the gateway device through the first network under the first protocol.

In certain embodiments, the computer executable code includes: a data store storing information of the control device, configuration data of the authenticated IoT devices and the plurality of APIs, wherein the information of the control device comprises information of the first network and the first protocol specific for the control device, and for each of the authenticated IoT devices, the configuration data comprises the corresponding API, the corresponding network and the corresponding protocol specific for the authenticated IoT device; and a processing module, configured to: receive, from the control device through the first network under the first protocol, the first command directed to the selected IoT device; retrieve, based on the first command, the configuration data of the selected IoT device from the data store; based on the configuration data of the selected IoT device, select, from the APIs, the corresponding API specific for the selected IoT device, and determine the corresponding network and the corresponding protocol for the selected IoT device; when the corresponding protocol for the selected IoT device is different from the first protocol, convert the first command to the second command, and send the second command to the selected IoT device using the corresponding API through the corresponding network under the corresponding protocol; and when the corresponding protocol for the selected IoT device is identical to the first protocol, send the first command to the selected IoT device using the corresponding API through the corresponding network under the corresponding protocol.

In certain embodiments, the processing module is further configured to: receive, from a designated IoT device of the authenticated IoT devices, a first signal directed to the control device through the corresponding network under the corresponding protocol for the designated IoT device; retrieve, based on the first signal, the configuration data of the designated IoT device from the data store; select, based on the configuration data of the designated IoT device, the corresponding API specific for the designated IoT device from the APIs stored in the data store, and process the first signal by the corresponding API specific for the designated IoT device; convert the first signal to a second signal transmittable under the first protocol; and send the second signal to the control device through the first network under the first protocol.

In certain embodiments, the IoT control application, when executed at the processor of the mobile device, is further configured to: receive the second signal from the gateway device; and display, based on the second signal, information corresponding to the designated IoT device on the user interface.

In certain embodiments, the first signal is a response signal in response to a command being sent from the gateway device to the designated IoT device.

In certain embodiments, the computer executable code further includes: a discovery module configured to perform at least one discovery operation for available IoT devices; and an authentication module configured to: in response to discovery of a new IoT device, generate an notification corresponding to the new IoT device being discovered, and send the notification to the control device through the first network under the first protocol; receive, from the control device through the first network under the first protocol, an approval command to approve authentication of the new IoT device being discovered, or a rejection command to reject authentication of the new IoT device being discovered; and in response to receiving the approval command to approve authentication of the new IoT device being discovered, store information of the corresponding API, the corresponding network and the corresponding protocol specific for the new IoT device being discovered in the data store as the configuration data of the new IoT device being discovered, and authenticate the new IoT device being discovered to become one of the authenticated IoT devices.

In certain embodiments, the IoT control application, when executed at the processor of the mobile device, is further configured to: receive the notification corresponding to the new IoT device being discovered from the gateway device; display, based on the notification, information corresponding to the new IoT device being discovered on the user interface; and in response to receiving an input corresponding to the new IoT device to approve or reject the authentication of the new IoT device being discovered, generate, based on the input, the approval command or the rejection command, and send the approval command or the rejection command to the gateway device.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
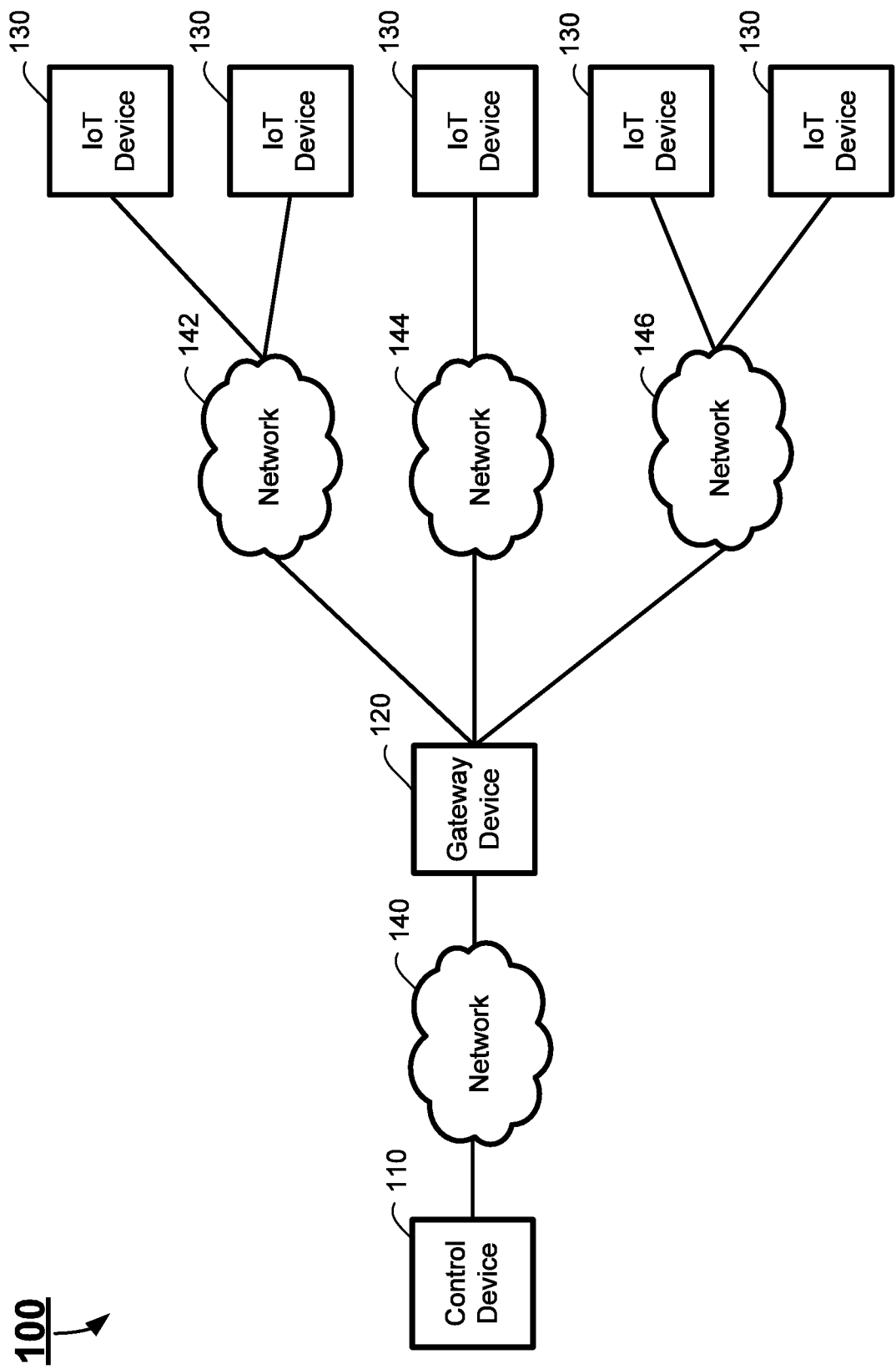
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied on IoT devices. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for controlling heterogeneous IoT devices using a single application. As discussed above, IoT devices do not have any common standards, and every IoT vendor has its own proprietary implementation of the IoT device. For example, each IoT vendor may provide a web interface or mobile app to access or control its IoT device. In some cases, some of the IoT devices may have cloud connectivity for data collection and remote access, whereas some other IoT devices can work only within the devices network range. Thus, a user using multiple IoT devices from different vendors may have to install multiple mobile apps on the smartphone, which becomes complex and cumbersome for the user.

Typically, every IoT vendor or manufacturer creates a device or a set of different devices using a plurality of steps, which may include, without being limited to: (a) defining the hardware interfaces such as I2C, Bluetooth, Wi-Fi, zigbee, etc. for the devices to use; (b) defining proprietary APIs and commands, or using standard APIs such as Thread, UPnP, etc; (c) defining the proprietary discovery mechanisms, or using standard ones; (d) writing mobile apps to access device through the cloud or directly to the IoT device, or to the IoT device through a gateway device; and (e) when cloud access is available, determining the choice of cloud to use. In some cases, when the IoT device is a mobile device having cloud access, the mobile device and cloud access may use Wi-Fi only. Thus, for non-Wi-Fi devices, there is a need to create additional gateway devices to convert the protocol to Wi-Fi. The gateway devices can also provide access to the cloud or directly connect to the mobile network. When every IoT manufacturer or vendor has the ability to decide every aspect of the above features or to eliminate any of the features, it creates an enormous amount of different kinds of devices, vendor gateways, different cloud services and a lot of mobile apps with different kinds of user interfaces. This causes a big problem for the end users when they start adding IoT devices to their network because of the following reasons:
  Discovery and adding devices is manufacturer specific.
  Position of vendor gateways depends on the device range.
  Firmware upgrade and mobile app updates has to be done per device.
  Each IoT device works independently and so the IoT devices cannot interact and do actions based on events. For example, when a thermostat (first IoT device) reads 78° F., there is no way to automatically switch a fan (second IoT device) on.

To simplify the access to heterogeneous IoT devices, certain aspects of the present disclosure implement systems and methods to control multiple heterogeneous IoT devices by providing one single mobile app and/or web interface to access and control the IoT devices. In certain embodiments, the system utilizes one single control device, which may be a mobile device with a unified mobile app as the IoT control application. The unified IoT control application may provide a single user interface, and may be connected to a single cloud which interact to a single gateway device. The single gateway device has to abstract all of the IoT devices from the user view. The gateway device includes multiple hardware interfaces, such as I2C, Bluetooth, Wi-Fi, Zigbee, etc., and provides multiple APIs and multiple connection protocols, such that the gateway device may physically access to all IoT devices available.

FIG. 1 schematically depicts a system according to certain embodiments of the present disclosure. As shown in FIG. 1, the system 100 includes a control device 110, a gateway device 120, and a plurality of IoT devices 130. The gateway device 120 is communicatively connected to the control device 110 through a network 140 under a first protocol, such as a Wi-Fi protocol. Further, the gateway device 120 is communicatively connected to each of the IoT devices 130 through a plurality of networks 142, 144 and 146, and the connection between the gateway device 120 and each of the IoT devices 130 may be under different corresponding protocols. In certain embodiments, each of the networks 140, 142, 144 and 146 may be an independent and separate network from one another, and each of the networks 140, 142, 144 and 146 may be wired or wireless network under different protocols, and may be of various forms. Examples of the networks may include, without being limited to, a local area network (LAN) or a wide area network (WAN) including the Internet; an I2C network; a Bluetooth network; a Wi-Fi network; a Zigbee network; a cloud network; or any other types of networks under any protocol. Further, the number of different networks provided in the system 100 may be dependent upon the types of the IoT devices 130 being provided. For example, when an additional IoT device 130 is added to the system 100, an additional network may be applied to interconnect the additional IoT device 130 and the gateway device 120. In certain embodiments, the network and the protocol being used to interconnect one or more of the IoT device 130 and the gateway device 120 may be the same network 140 and the same protocol being used to interconnect the gateway device 120 and the control device 110.

The control device 110 is a computing device being used by a user to control the IoT devices 130. In certain embodiments, the control device 110 may be a mobile device, such as a smartphone, a tablet, a laptop computer, or any other types of mobile devices. In certain embodiments, the control device 110 may be other computing devices, such as a desktop computer, a management controller, a system-on-chip (SOC), or any other types of computing device.

Figure 2A:
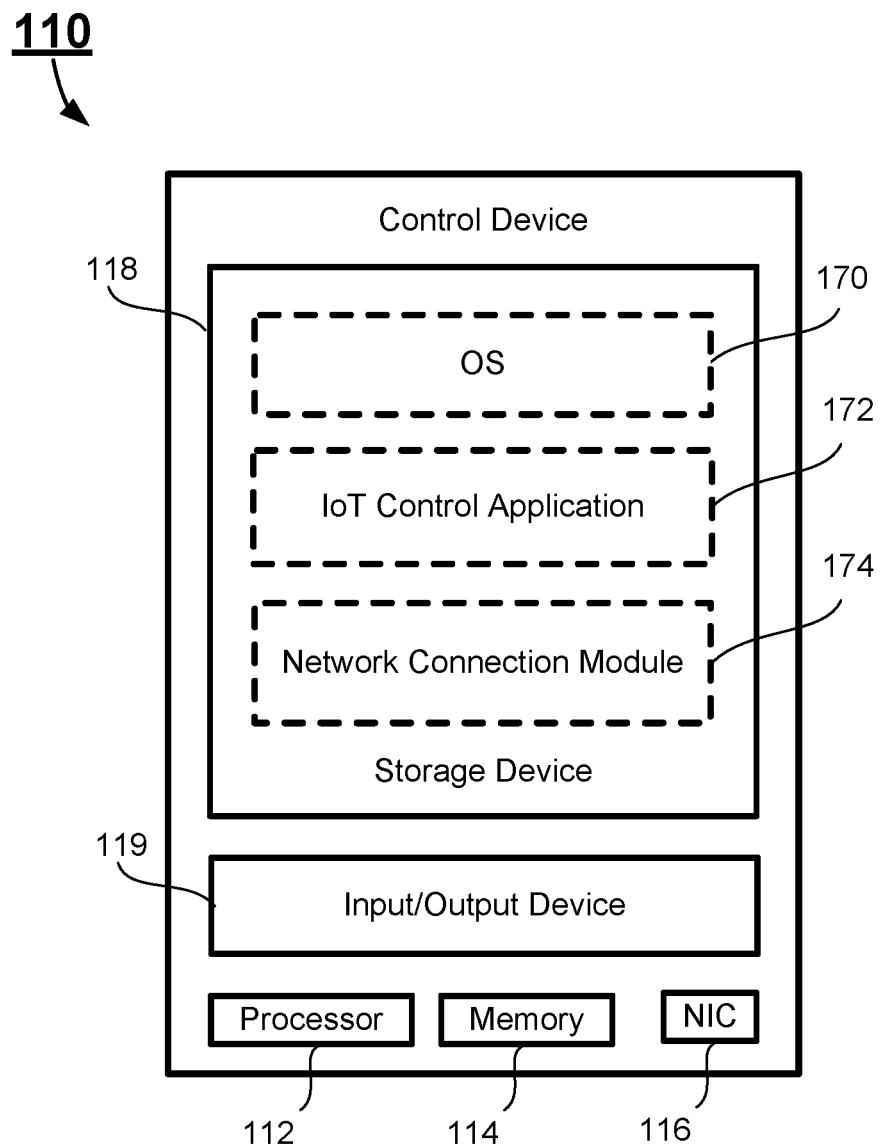
FIG. 2A schematically depicts a control device of the system according to certain embodiments of the present disclosure.

FIG. 2A schematically depicts a control device of the system according to certain embodiments of the present disclosure. As shown in FIG. 2A, the control device 110 may include, without being limited to, a processor 112, a memory 114, a network interface card (NIC) 116, a storage device 118, and one or more input/output (I/O) device 119. In certain embodiments, the control device 110 may include other hardware components and software components (not shown) to perform its corresponding tasks. Examples of these hardware and software components may include, but not limited to, other required memory, interfaces, buses, I/O modules and peripheral devices.

The processor 112 is configured to control operation of the control device 110. In certain embodiments, the processor 112 may be a central processing unit (CPU). The processor 112 can execute an operating system (OS) 170 and/or other applications, such as the IoT control application 172, of the control device 110. In some embodiments, the control device 110 may have more than one processor, such as two processors, four processors, eight processors, or any suitable number of processors.

The memory 114 can be a volatile memory, such as the random-access memory (RAM), for storing the data and information during the operation of the control device 110. In certain embodiments, the control device 110 may run on more than one memory 114.

The NIC 116 is a network interface, which functions as a point of interconnection between the control device 110 and the gateway device 120 through the network 140. In certain embodiments, the NIC 116 may be implemented by hardware and/or software components, and does not necessarily have a physical form. In certain embodiments, the control device 110 may include more than one NIC 116 to be connectable to multiple different networks.

The storage device 118 is a non-volatile data storage media for storing the OS 170 and other applications of the control device 110. Examples of the storage device 118 may include non-volatile memory such as flash memory, memory cards, USB drives, hard drives, floppy disks, optical drives, or any other types of data storage devices. In certain embodiments, the control device 110 may have multiple storage devices 118, which may be identical storage devices or different types of storage devices, and the applications of the control device 110 may be stored in one or more of the storage devices 118 of the control device 110.

The I/O device 119 is a peripheral device to allow the user of the control device 110 to input and output signals to/from the control device 110. In certain embodiments, the control device 110 may include more than one I/O devices 119. In certain embodiments, each of the I/O devices 119 may be an input device such as a keyboard, a mouse, a touchpad or other input devices; an output device such as a display device, a speaker, or other output devices, or a I/O device capable of dual I/O purposes, such as a touch panel of a mobile device.

As shown in FIG. 2A, the applications stored in the storage device 118 may include the OS 170, an IoT control application 172, and a network connection module 174. Each of the applications may include computer executable code or instructions executable at the processor 112 of the control device 110. In certain embodiments, the computer executable code or instructions of the applications may collectively form a firmware module. In certain embodiments, one or more of the applications may each include sub-modules. Alternatively, in certain embodiments, some or all of the applications may collectively form a single module.

The OS 170 is a collective management software application managing the operation of the control device 110. For example, the OS 170 can include a set of functional programs that control and manage operations of the devices connected to the control device 110. The set of application programs provide certain utility software for the user to manage the control device 110. In certain embodiments, the OS 170 is operable to multitask, i.e., execute computing tasks in multiple threads. Examples of the OS 170 may be any of the commercial operating systems. For example, when the control device 110 is a mobile device, the OS may be iOS, Android, Microsoft Windows 8, Blackberry OS, or any other mobile operating systems for the mobile device.

The IoT control application 172 is a unified application to control the IoT devices 130 through the gateway device 120. In certain embodiments, when the IoT control application 172 is executed, the IoT control application 172 provides a user interface (UI) to display information of the IoT devices 130 of the system 100 on the I/O device 119. The UI allows the user of the control device 110 to input, through the I/O device 119, a command to control the IoT device 130. For example, the user may use the I/O device 119 to select one of the IoT devices 130 displayed on the UI as a selected IoT device, and input certain actions for the selected IoT device to perform. The IoT control application 172, based on the user input, may generate the command directed to the selected IoT device, and then send the command to the gateway device 120. In certain embodiments, when the IoT control application 172 receives information from the gateway device 120 in relation to one or more of the IoT devices 130, the IoT control application 172 may display the information of the IoT devices 130 on the UI, such that the user may be aware of the information of the IoT devices 130. In certain embodiments, when the gateway device 120 sends a notification corresponding to a new IoT device being discovered, the IoT control application 172 may receive the notification, and then display information corresponding to the new IoT device being discovered on the UI based on the notification, such that the user may choose to approve or reject authentication of the new IoT device.

The network connection module 174 is a software module to control data being transmitted through the NIC 116. In certain embodiments, when the OS 170 or the IoT control application 172 intends to transmit a command or data to the network through the NIC 116, the network connection module 174 may process the command or the data and transmit the processed command or data to the network through the NIC 116. In certain embodiments, when the control device 110 receives a signal from the network 140 through the NIC 116, the network connection module 174 may process the signal, and forward the processed signal to the corresponding application, such as the OS 170 or the IoT control application 172.

The gateway device 120 is an intermediate device between the control device 110 and the IoT devices 130. In certain embodiments, the gateway device 120 includes multiple hardware interfaces, such as I2C, Bluetooth, Wi-Fi, Zigbee, etc., and provides multiple APIs and multiple connection protocols, such that the gateway device 120 may physically access to all IoT devices 130 available in the system 100. In certain embodiments, the gateway device 120 may be implemented by a hub device or a computing device, such as a management controller or a SOC. In certain embodiments, the gateway device 120 may be a headless computing device, which operates without a monitor, a user interface or peripheral devices such as a keyboard and a mouse. The operation of the gateway device 120 may be remotely controlled and monitored by the control device 110.

Figure 2B:
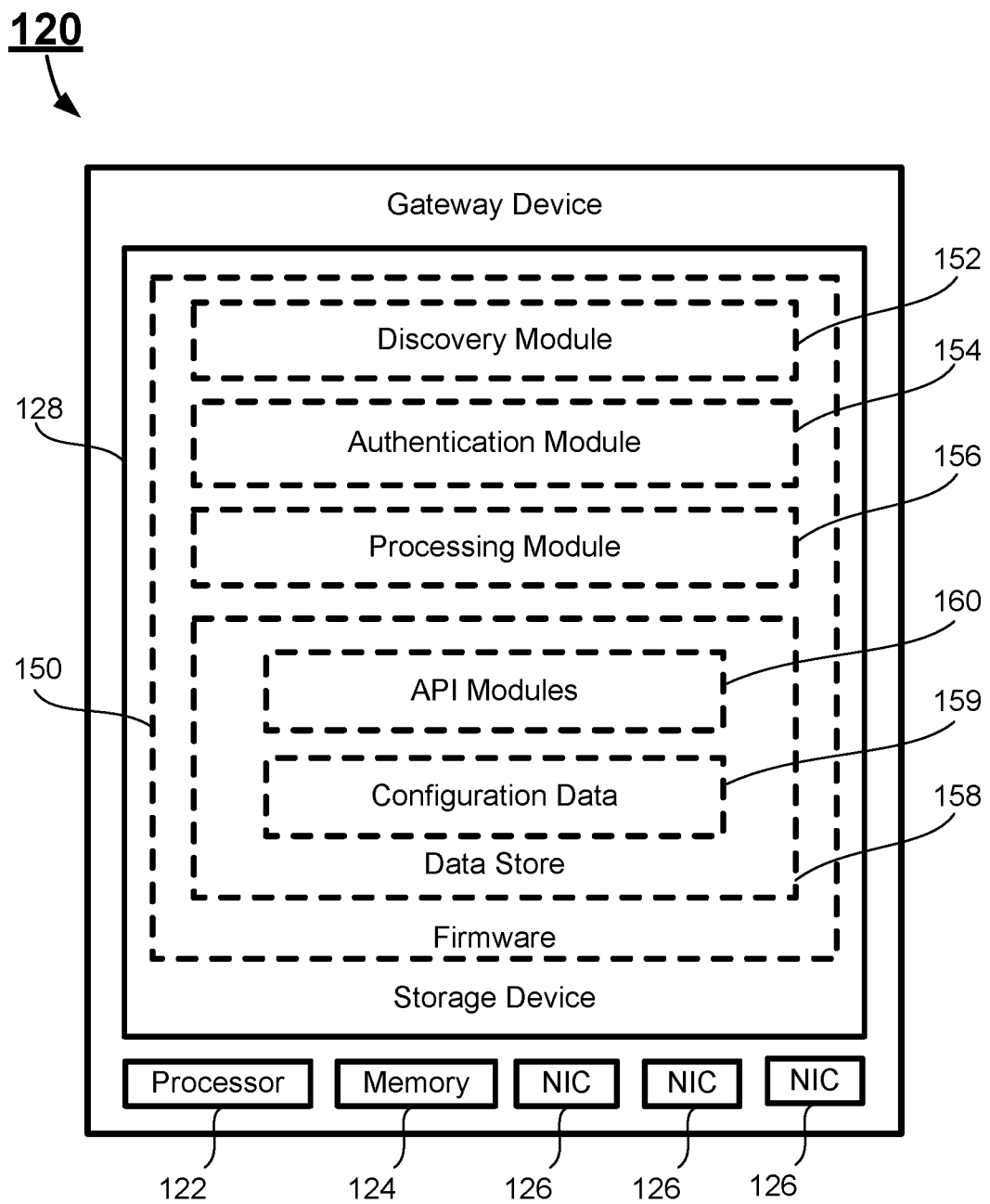
FIG. 2B schematically depicts a gateway device of the system according to certain embodiments of the present disclosure.

FIG. 2B schematically depicts a gateway device of the system according to certain embodiments of the present disclosure. As shown in FIG. 2B, the gateway device 120 may include, without being limited to, a processor 122, a memory 124, multiple NICs 126, and a storage device 128. In certain embodiments, the gateway device 120 may include other hardware components and software components (not shown) to perform its corresponding tasks.

Examples of these hardware and software components may include, but not limited to, other required memory, interfaces, buses, I/O modules and peripheral devices.

The processor 122 is configured to control operation of the gateway device 120. In certain embodiments, the processor 122 may be a central processing unit (CPU). The processor 122 can execute the software modules or applications of the gateway device 120. In some embodiments, the gateway device 120 may have more than one processor, such as two processors, four processors, eight processors, or any suitable number of processors.

The memory 124 can be a volatile memory, such as the random-access memory (RAM), for storing the data and information during the operation of the gateway device 120. In certain embodiments, the gateway device 120 may run on more than one memory 124.

Each of the NICs 126 is a network interface, which functions as a point of interconnection between the gateway device 120 and the networks 140, 142, 144 and 146. The number of the NICs 126 may be dependent upon the available networks and protocols to which the gateway device 120 is connected. Since the gateway device 120 is communicatively connected to the control device 110 and to the IoT devices 130, each of the NICs 126 must be operational under the first protocol, which is used for communication with the control device 110, or under one of the corresponding protocols for the IoT devices 130. In certain embodiments, the NICs 126 may be implemented by hardware and/or software components, and does not necessarily have a physical form. In certain embodiments, some or all of the NICs 126 may be a dedicated NIC, which is dedicated for connection to one of the networks under a certain protocol. Alternatively, in certain embodiments, some or all of the NICs 126 may be a shared NIC, which may be responsible for connection to one or more of the networks under different protocols.

The storage device 128 is a non-volatile data storage media for storing the software modules and/or applications of the gateway device 120. Examples of the storage device 128 may include non-volatile memory such as flash memory, memory cards, USB drives, hard drives, floppy disks, optical drives, or any other types of data storage devices. In certain embodiments, the gateway device 120 may have multiple storage devices 128, which may be identical storage devices or different types of storage devices, and the software modules and/or applications of the gateway device 120 may be stored in one or more of the storage devices 128 of the gateway device 120.

As shown in FIG. 2B, the software modules stored in the storage device 128 may include a discovery module 152, an authentication module 154, a processing module 156, and a data store 158, which stores configuration data 159 of the control device 110 and the IoT devices 130 and a plurality of API modules 160. Each of the software modules may include computer executable code or instructions executable at the processor 112 of the control device 110. In certain embodiments, the computer executable code or instructions of the applications may collectively form a firmware module. In certain embodiments, one or more of the applications may each include sub-modules. Alternatively, in certain embodiments, some or all of the applications may collectively form a single module.

The discovery module 152 is configured to perform the discovery operations for the IoT devices 130. In certain embodiments, the discovery module 152 may be scheduled to perform the discovery operations periodically according to a predetermined schedule. Alternatively, the discovery module 152 may perform a discovery operation according an instruction received from the control device 110. Specifically, in the discovery operation, the discovery module 152 is configured to send one or more request messages to the networks of the system 100 via the NICs 126. If an IoT device 130 is in one of the networks and receives a request message, the IoT device 130 may then send a feedback message to the discovery module 152, such that a communication channel is constructed between the IoT device 130 and the discovery module 152 through the corresponding network under the corresponding protocol. The feedback message may include identification information and status of the corresponding IoT device 130, such that the discovery module 152 may recognize the IoT device 130 using the information. In certain embodiments, the discovery operations may utilize the standard discovery mechanisms under certain protocols, or may utilize existing vendor-specific discovery mechanisms provided by the vendors of the IoT devices 130.

The authentication module 154 is configured to perform the authentication operations for the IoT devices 130. Specifically, when the discovery module 152 finds a new IoT device in one of the networks of the system 100, the new IoT device must be authenticated before being added to the system 100. In response to finding the new IoT device, the authentication module 154 may generate a notification corresponding to the new IoT device being discovered, and send the notification to the control device 110 for approval. In certain embodiments, the notification includes the identification information and other related information of the new IoT device being discovered. When the control device 110 receives the notification, the user at the control device 110 may choose to approve or to reject the authentication of the new IoT device being discovered through the UI. Once the control device 110 receives the user input, the control device 110 may correspondingly generate an approval command or a rejection command based on the user input, and send the approval command or the rejection command to the gateway device 120. At the gateway device, when the authentication module 154 receives the approval command, the authentication module 154 may store information of the corresponding API, the corresponding network and the corresponding protocol specific for the new IoT device being discovered in the data store 158 as the configuration data 159 of the new IoT device being discovered, and authenticate the new IoT device being discovered to become one of the authenticated IoT devices 130. On the other hand, if the authentication module 154 receives the rejection command, the authentication module 154 does nothing, and the new IoT device being discovered is not authenticated.

It should be noted that a user of the system 100 may choose to authenticate only some, but not all, of the IoT devices being discovered in the discovery operations. For example, in a house having multiple IoT devices to control the doors, lights and electronic devices, the user (i.e., an owner of the house) may choose to authenticate all of the IoT devices 130 within the house, such that he or she may have control over all of the authenticated IoT devices 130 within the house. However, the neighbors may also use IoT devices, and the IoT devices in the neighborhood may be within the accessible range of the wireless network connected to the gateway device 120. In this case, the user (i.e., the owner of the house) would probably not want to control any IoT device in a neighbor's house because it may causes unnecessary troubles. Thus, if the gateway device 120 performs the discovery operation and finds an IoT device in the neighborhood, the user probably would not authenticate the IoT device to avoid troubles.

The processing module 156 is configured to perform the two-way communications between the control device 110 and the IoT devices 130. In certain embodiments, the processing module 156 may receive, from the control device 110 through the network 140 under the first protocol, a command (hereinafter the first command) directed to a selected IoT device 130 of the system 100. In certain embodiments, the first command may include identification information of the selected IoT device 130. In response to receiving the first command from the control device 110, the processing module 156 may retrieve necessary data corresponding to the selected IoT device 130 from the data store 158. Specifically, the necessary data corresponding to the selected IoT device 130 may include a corresponding API specific for the selected IoT device 130 and the configuration data of the selected IoT device 130. In certain embodiments, the processing module 156 may retrieve the configuration data of the selected IoT device 130 from the data store 158. Based on the configuration data, the processing module 156 may select, from a plurality of APIs stored in the API modules 160 of the data store 158, a corresponding API specific for the selected IoT device 130, and determine the corresponding network and the corresponding protocol for the selected IoT device 130. Then, the processing module 156 may determine if the corresponding protocol for the selected IoT device 130 is different from the first protocol (i.e., the protocol used for the connection between the gateway device 120 and the control device 110). When the corresponding protocol for the selected IoT device 130 is different from the first protocol, the processing module 156 converts the first command to a second command transmittable under the corresponding protocol for the selected IoT device 130, and then sends the second command to the selected IoT 130 device using the corresponding API through the corresponding network under the corresponding protocol. The format of the second command may be different from that of the first command. On the other hand, when the corresponding protocol for the selected IoT device 130 is identical to the first protocol, the processing module 156 will determine that the first command is transmittable under the first protocol (i.e., the corresponding protocol for the selected IoT device 130), and then send the first command to the selected IoT device 130 using the corresponding API through the corresponding network under the corresponding protocol without converting the command.

In certain embodiments, the processing module 156 may receive, from one of the authenticated IoT devices 130 (hereinafter a "designated IoT device" 130), a first signal directed to the control device 110. Specifically, the processing module 156 may receive the first signal from the designated IoT device 130 through the corresponding network under the corresponding protocol for the designated IoT device. In order to process the first signal properly, the processing module 156 may retrieve, based on the first signal, the configuration data 159 of the designated IoT device 130 from the data store 158. Based on the configuration data of the designated IoT device 130, the processing module 156 may select the corresponding API specific for the designated IoT device 130 from the APIs stored in the API modules 160 of the data store 158, and process the first signal by the corresponding API specific for the designated IoT device 130. Then, the processing module 156 may determine if the corresponding protocol for the designated IoT device 130 is different from the first protocol (i.e., the protocol used for the connection between the gateway device 120 and the control device 110). When the corresponding protocol for the designated IoT device 130 is different from the first protocol, the processing module 156 converts the first signal to a second signal transmittable under the first protocol, and then sends the second signal to the control device 110 through the first network 140 under the first protocol. The format of the second signal may be different from that of the first signal. On the other hand, when the corresponding protocol for the designated IoT device 130 is identical to the first protocol, the processing module 156 will determine that the first signal is transmittable under the first protocol, and then send the first signal to the control device 110 through the first network 140 under the first protocol without converting the signal.

The data store 158 is a database which stores the necessary data for the operation of the gateway device 120. In certain embodiments, the data stored in the data store 158 may include, without being limited to, the information of the control device 110, the configuration data of the authenticated IoT devices 130, and the APIs. As shown in FIG. 2B, the data store 158 include a configuration data module 159 and a plurality of API modules 160. The configuration data module 159 stores the information of the control device 110 and the configuration data of each of the authenticated IoT devices 130. In certain embodiments, for each of the authenticated IoT devices 130, the configuration data may include, without being limited to, the corresponding network and the corresponding protocol specific for the authenticated IoT device 130. The API modules 160 include the APIs for the authenticated IoT devices 130. In certain embodiments, each of the APIs may be a standard API, such as Thread or UPnP, or a vendor-specific proprietary API provided by the vendors.

Each of the IoT devices 130 is a device with IoT functionalities, which communicates with the gateway device 120 such that the control device 110 may send commands to the IoT devices 130 through the gateway device 120. In certain embodiments, each of the IoT devices 130 may be capable of performing an action, or generating a signal. In certain embodiments, the IoT devices 130 may be capable of performing the action in response to an event. In certain embodiments, the event may be a command being sent from the gateway device 120. In certain embodiments, the signal being generated by one of the IoT devices 130 may be used as an event, which may be used to trigger the gateway device 120 to generate a corresponding command for an action of another IoT device 130. It should be particularly noted that, as described above, if an IoT device is not authenticated, the authentication module 154 will not add the information of the IoT device in the data store 158. Thus, each of the IoT devices 130 in the system 100 is an authenticated IoT device 130.

In operation, the control device 110 and the gateway device 120 may be configured to perform a discovery operation for new IoT devices. Once an IoT device has been added to the system as an authenticated IoT device 130, the gateway device 120 may send a command from the control device 110 to a selected IoT device 130. Alternatively, the gateway device 120 may send a signal from a designated IoT device 130 to the control device 110.

Figure 3:
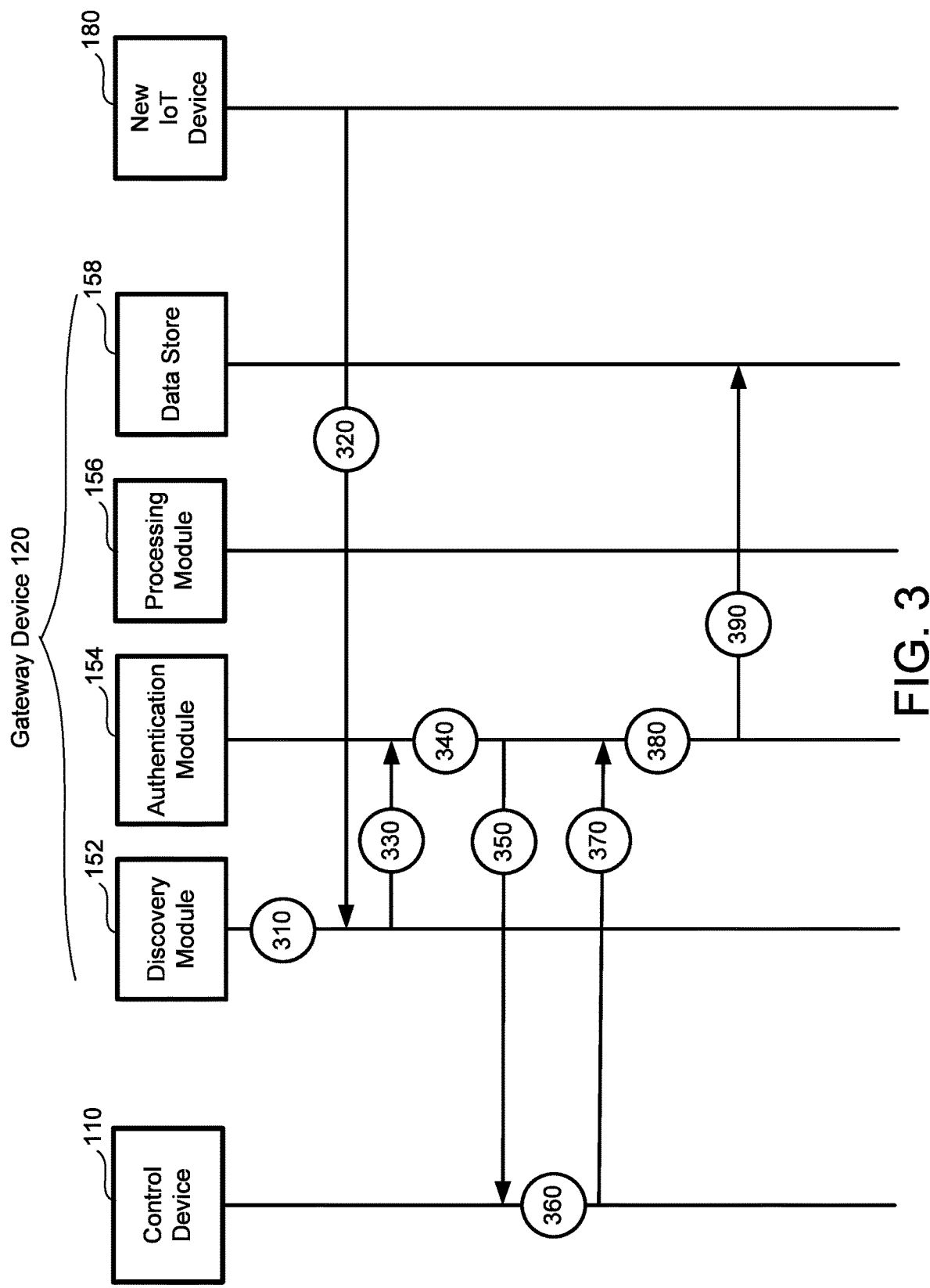
FIG. 3 depicts a flowchart showing a method for discovery of a new IoT device according to certain embodiments of the present disclosure.

FIG. 3 depicts a flowchart showing a method for discovery of a new IoT device according to certain embodiments of the present disclosure. In certain embodiments, the method as shown in FIG. 3 may be implemented on a system as shown in FIG. 1. It should be particularly noted that, unless otherwise stated in the present disclosure, the steps of the method may be arranged in a different sequential order, and are thus not limited to the sequential order as shown in FIG. 3.

As shown in FIG. 3, at procedure 310, the discovery module 152 performs a discovery operation to find available IoT devices. In certain embodiments, the discovery module 152 is configured to send one or more request messages to the networks of the system 100. In certain embodiments, the discovery module 152 may be scheduled to perform the discovery operations periodically according to a predetermined schedule. Alternatively, the discovery module 152 may perform a discovery operation according an instruction received from the control device 110. In certain embodiments, the discovery operations may utilize the standard discovery mechanisms under certain protocols, or may utilize existing vendor-specific discovery mechanisms provided by the vendors of the IoT devices 130.

At procedure 320, a new IoT device 180, which is within the discoverable range of the gateway device 120, sends a feedback message to the discovery module 152 in response to the request message of the discovery operation. Once receiving the feedback message, at procedure 330, the discovery module 152 notifies the authentication module 154 to perform an authentication operation for the new IoT device 180 being discovered.

At procedure 340, the authentication module 154 generates a notification notification corresponding to the new IoT device 180 being discovered. In certain embodiments, the notification includes the identification information and other related information of the new IoT device 180 being discovered. At procedure 350, the authentication module 154 sends the notification to the control device 110 through the network 140 under the first protocol.

When the control device 110 receives the notification, at procedure 360, the IoT control application 172 of the control device 110 may display information corresponding to the new IoT device being discovered on the I/O device 119 through the UI based on the notification, such that the user may choose to approve or reject authentication of the new IoT device. In certain embodiments, the user may use the I/O device 119 to input an choice to approve or to reject the authentication of the new IoT device 180. Once the control device 110 receives the user input, the IoT control application 172 of the control device 110 may generate, based on the user input, the corresponding approval command or the rejection command for the new IoT device 180. At procedure 370, the control device 110 sends the approval command or the rejection command back to the gateway device 120.

At the gateway device 120, once the approval command or the rejection command is received, at procedure 380, the authentication module 154 will determine whether the received command is an approval command. If the received command is a rejection command, the authentication module 154 does nothing. On the other hand, if the received command is an approval command, at procedure 390, the authentication module 154 may store information of the corresponding API, the corresponding network and the corresponding protocol specific for the new IoT device 180 in the data store 158 as the configuration data 159 of the new IoT device 180, and authenticate the new IoT device 180 to become one of the authenticated IoT devices 130. In this way, the authentication operation is completed.

Figure 4:
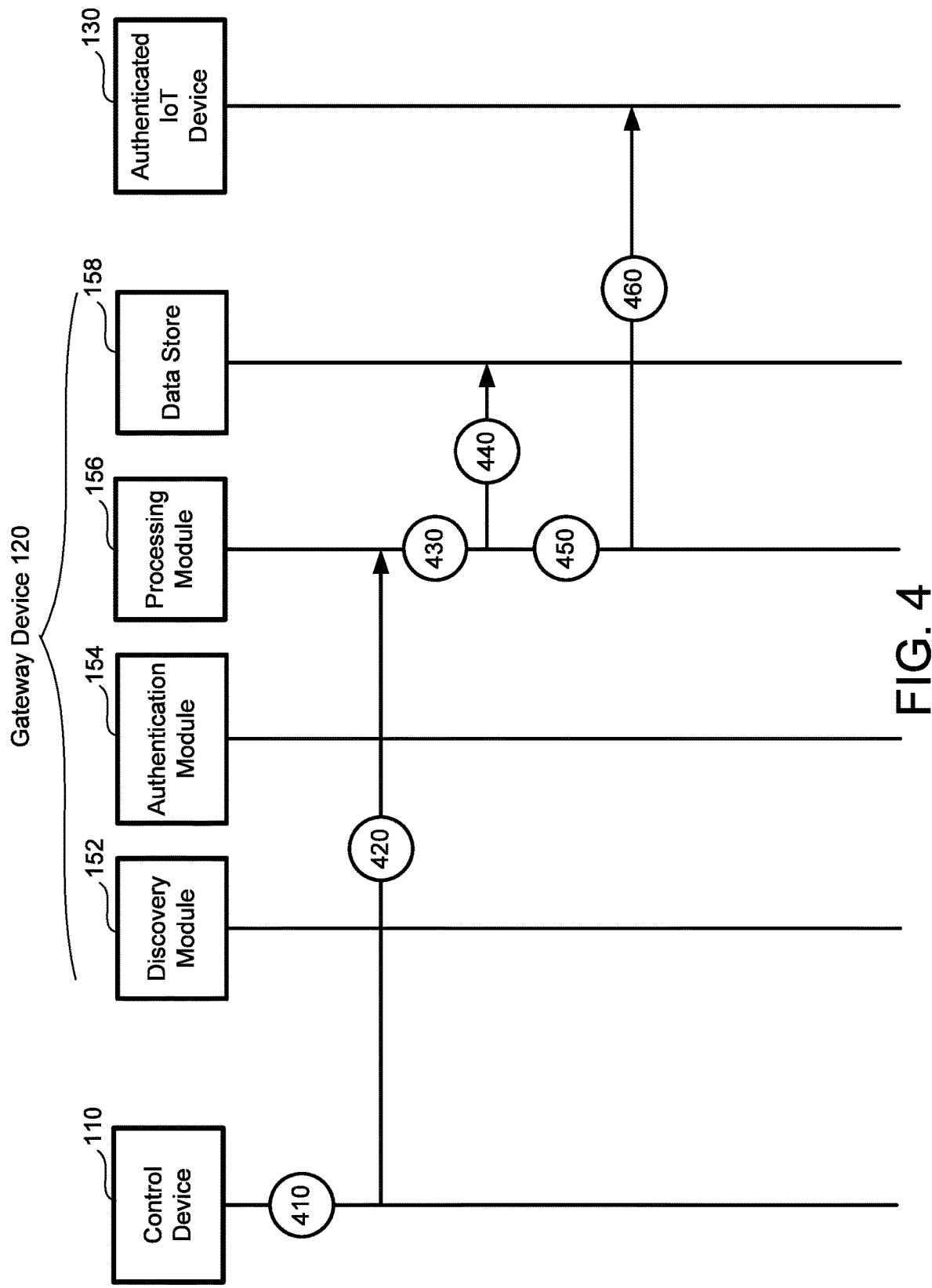
FIG. 4 depicts a flowchart showing a method for sending a command from the control device to the IoT device according to certain embodiments of the present disclosure.

FIG. 4 depicts a flowchart showing a method for sending a command from the control device to the IoT device according to certain embodiments of the present disclosure. In certain embodiments, the method as shown in FIG. 4 may be implemented on a system as shown in FIG. 1. It should be particularly noted that, unless otherwise stated in the present disclosure, the steps of the method may be arranged in a different sequential order, and are thus not limited to the sequential order as shown in FIG. 4.

As shown in FIG. 4, at procedure 410, the control device 110 may receive an input corresponding to a selected IoT device of the system 100, which is an authenticated IoT device 130. In response to the input, the IoT control application 172 of the control device 110 may generate, based on the input, a corresponding first command directed to the selected IoT device 130. At procedure 420, the control device 110 sends the first command to the gateway device 120 through the network 140 under the first protocol.

At the gateway device 120, upon receiving the first command, at procedure 430, the processing module 156 may process the first command in order to obtain the information related to the selected IoT device 130. Then, at procedure 440, the processing module 156 may retrieve, based on the first command, the configuration data of the selected IoT device 130 from the data store 158. Consequently, the processing module 156 may select, based on the configuration data of the selected IoT device 130, from the APIs stored in the data store 158, the corresponding API specific for the selected IoT device 130. At procedure 450, the processing module 156 may determine, based on the configuration data of the selected IoT device 130, the corresponding network and the corresponding protocol for the selected IoT device 130. In certain embodiments, once the corresponding protocol for the selected IoT device 130 is determined, the processing module 156 may determine whether the corresponding protocol for the selected IoT device 130 is different from the first protocol. If the corresponding protocol for the selected IoT device 130 is different from the first protocol, the processing module 156 may convert the first command to a second command transmittable under the corresponding protocol for the selected IoT device 130. If the corresponding protocol for the selected IoT device 130 is identical to the first protocol, no conversion is required for the first command. At procedure 460, the processing module 156 sends the command (which may be the converted second command, or the first command when no conversion is required) to the selected IoT device 130 using the corresponding API through the corresponding network under the corresponding protocol.

Figure 5:
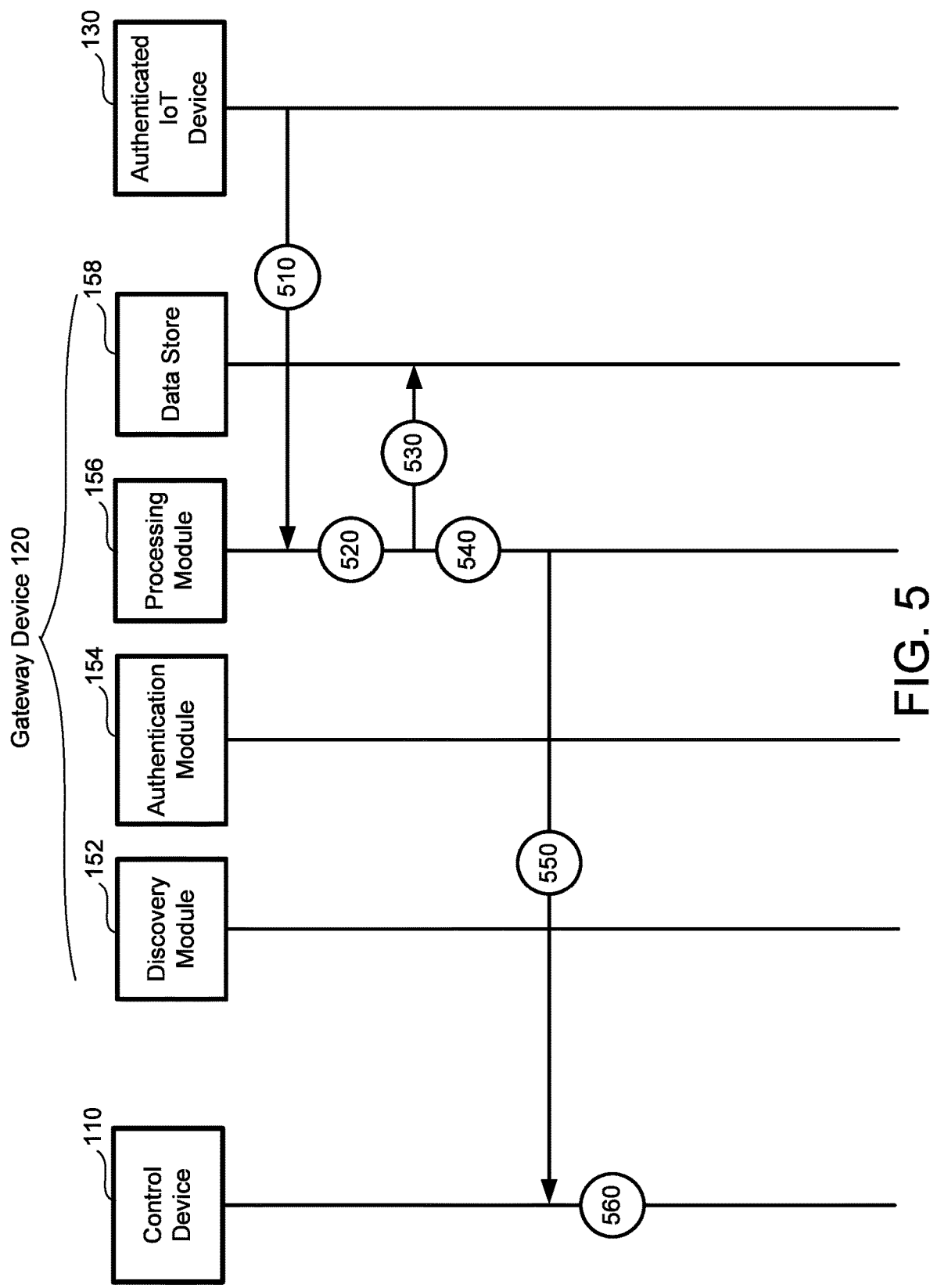
FIG. 5 depicts a flowchart showing a method for sending a signal from the IoT device to the control device according to certain embodiments of the present disclosure.

FIG. 5 depicts a flowchart showing a method for sending a signal from the IoT device to the control device according to certain embodiments of the present disclosure. In certain embodiments, the method as shown in FIG. 5 may be implemented on a system as shown in FIG. 1. It should be particularly noted that, unless otherwise stated in the present disclosure, the steps of the method may be arranged in a different sequential order, and are thus not limited to the sequential order as shown in FIG. 5.

As shown in FIG. 5, at procedure 510, a designated authenticated IoT device 130 generates a first signal, and sends the first signal to the gateway device 120 through the corresponding network under the corresponding protocol. In certain embodiments, the first signal is a response signal in response to a command being sent from the gateway device 120 to the designated IoT device 130.

At the gateway device 120, upon receiving the first signal, at procedure 520, the processing module 156 may obtain the information of the designated IoT device 130 from the first signal. Then, at procedure 530, the processing module 156 may retrieve, based on information obtained from the first signal, the configuration data of the designated IoT device 130 from the data store 158, and then select, based on the configuration data of the designated IoT device 130, the corresponding API specific for the designated IoT device 130 from the APIs stored in the data store 158. At procedure 540, the processing module 156 may process the first signal by the corresponding API specific for the designated IoT device 130. In certain embodiments, once the configuration data of the designated IoT device 130 is retrieved, the processing module 156 may determine the corresponding protocol for the designated IoT device 130, and whether the corresponding protocol for the designated IoT device 130 is different from the first protocol. If the corresponding protocol for the designated IoT device 130 is different from the first protocol, at procedure 540, the processing module 156 may convert the first signal to a second signal transmittable under the first protocol. If the corresponding protocol for the designated IoT device 130 is identical to the first protocol, no conversion is required for the first signal. At procedure 550, the processing module 156 sends the signal (which may be the converted second signal, or the first signal when no conversion is required) to the control device 110 through the network 140 under the first protocol.

At the control device 110, upon receiving the signal from the gateway device 120, at procedure 560, the IoT control application 172 of the control device 110 may display, based on the received signal, information corresponding to the designated IoT device 130 on the UI, such that the user may be aware of an event corresponding to the signal being occurred at the designated IoT device 130.

With the system 100 as described above, the control device 110 provides a single user interface with the IoT control application, and the gateway device 120 may access to different IoT devices 130 under different protocols. In certain embodiments, when firmware upgrade and/or application update are required at the gateway device 120 or at the control device 110, a single upgrading or updating operation may be performed for each of the control device 110 and the gateway device 120, and there is no need to perform the upgrading or updating operations based on different IoT devices. Further, the use of the gateway device 120 allows each of the IoT devices 130 to possibly interact with one another.

Figure 6A:
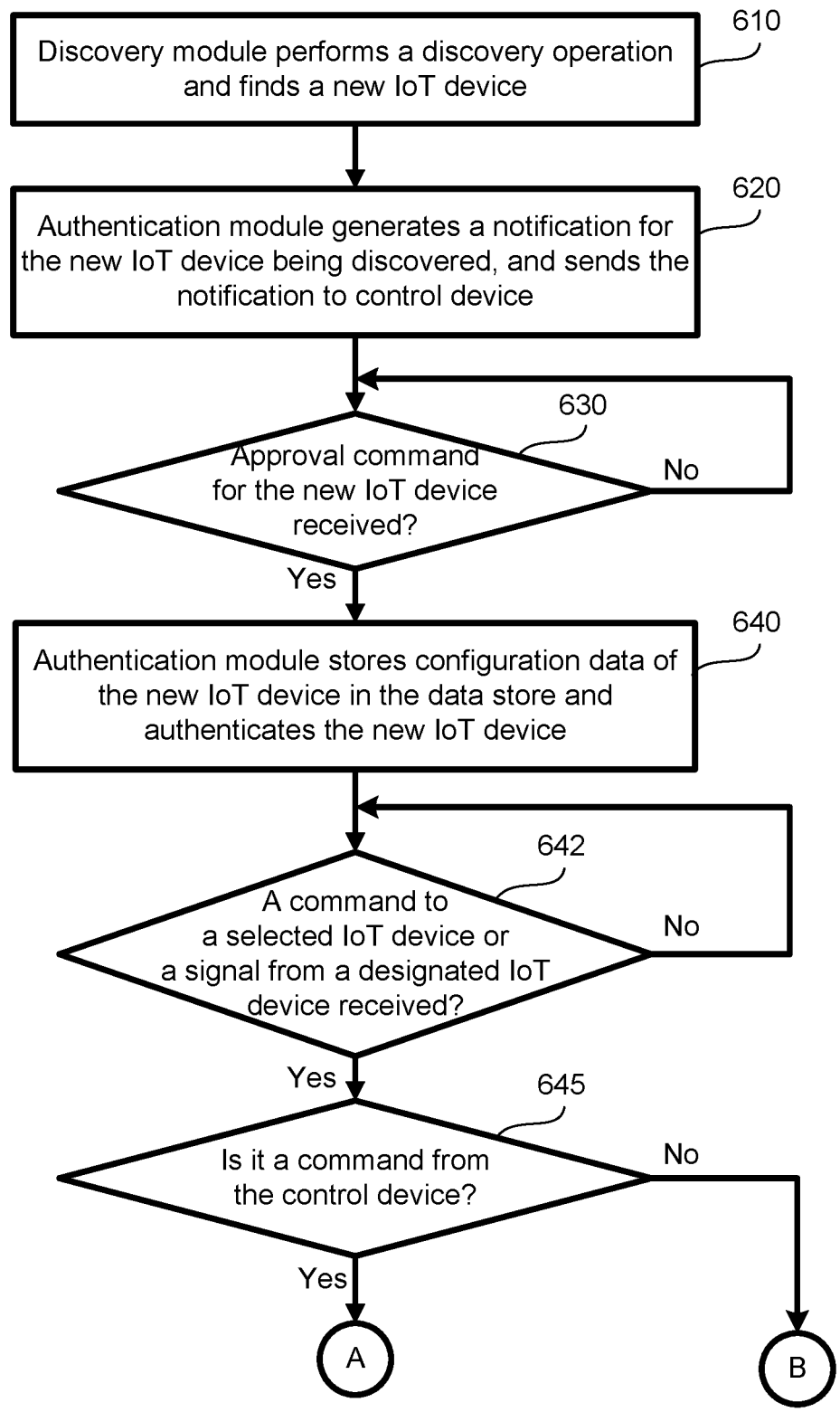
FIGS. 6A, 6B and 6C depict a flowchart showing a method for controlling heterogeneous IoT devices using the gateway device according to certain embodiments of the present disclosure.
Figure 6B:
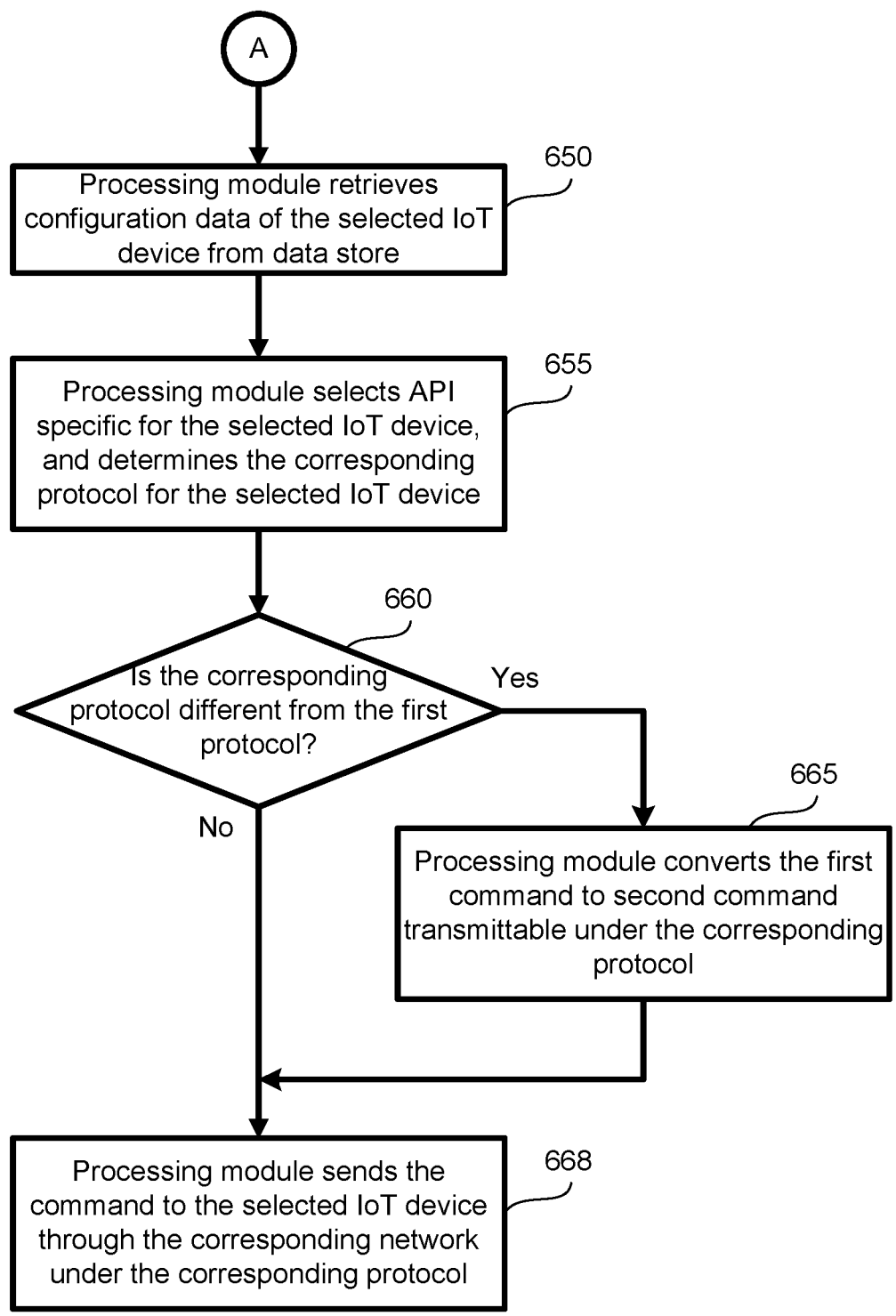
Figure 6C:
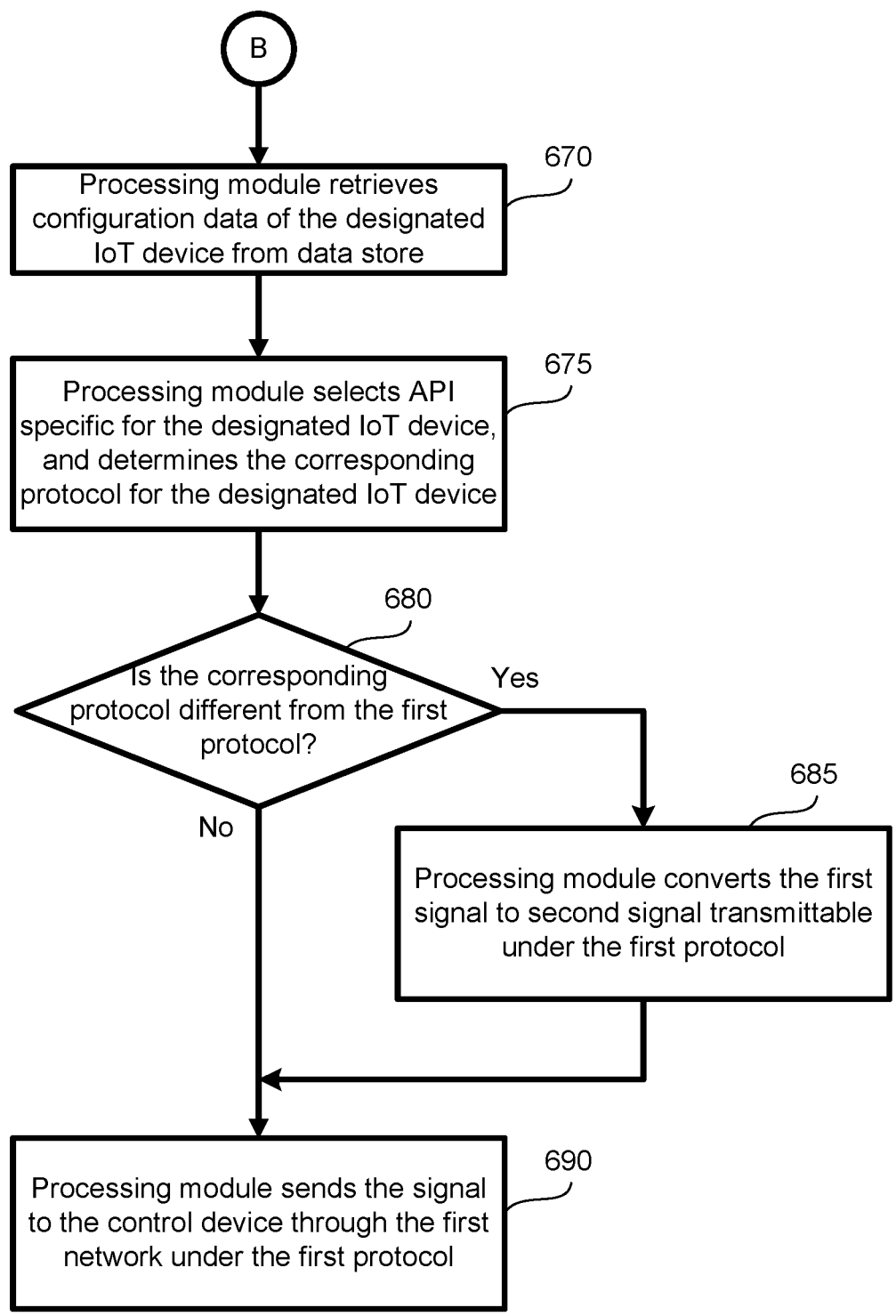

A further aspect of the present disclosure is directed to a method for controlling heterogeneous IoT devices. FIGS. 6A, 6B and 6C depict a flowchart showing a method for controlling heterogeneous IoT devices using the gateway device according to certain embodiments of the present disclosure. In certain embodiments, the method as shown in FIGS. 6A, 6B and 6C may be implemented on a system 100 as shown in FIG. 1 and the gateway device 120 as shown in FIG. 2B. It should be particularly noted that, unless otherwise stated in the present disclosure, the steps of the method may be arranged in a different sequential order, and are thus not limited to the sequential order as shown in the flowchart.

Referring to FIG. 6A, at procedure 610, when the gateway device 120 is installed, the discovery module 152 of the gateway device 120 may perform one or more discovery operations to find new IoT devices 180. Once a new IoT device 180 is discovered, at procedure 620, the authentication module 154 generates a notification for the new IoT device 180 being discovered, and sends the notification to the control device 110 for approval. Once the notification is sent, at procedure 630, the gateway device 120 waits for receiving of the approval command for the new IoT device 180. If the gateway device 120 receives the approval command for the new IoT device 180, the authentication module 154 stores the configuration data of the new IoT device in the data store 158, and authenticates the new IoT device to become one of the authenticated IoT device 130. Alternatively, if the gateway device 120 does not receive any approval command, or instead receives a rejection command, the authentication module 154 does nothing, and the new IoT device 180 will not be authenticated.

Once the authenticated IoT device 130 is added to the system, at procedure 642, the gateway device 120 may wait for any incoming messages, and determine whether an incoming message either receiving a command to a selected IoT device 130 from the control device 110, or for receiving a signal from a designated IoT device 130 directed to the control device 110. At the procedure 645, if the gateway device 120 receives a message which is a command directed to a selected IoT device 130 from the control device 110, the gateway device 120 moves to procedure 650. Alternatively, if the gateway device 120 receives a message which is a signal from a designated IoT device 130 directed to the control device 110, the gateway device 120 moves to procedure 670.

Referring to FIG. 6B, when the gateway device 120 receives a first command directed to a selected IoT device 130 from the control device 110, at procedure 650, the processing module 156 retrieves the configuration data of the selected IoT device 130 from the data store 158. At procedure 655, the processing module 156 selects a corresponding API specific for the selected IoT device 130, and determines the corresponding protocol as well as the corresponding network for the selected IoT device 130. At procedure 660, the processing module 156 determines whether corresponding protocol for the selected IoT device 130 is different from the first protocol. If the corresponding protocol for the selected IoT device 130 is different from the first protocol, at procedure 665, the processing module 156 may convert the first command to a second command transmittable under the corresponding protocol for the selected IoT device 130. If the corresponding protocol for the selected IoT device 130 is identical to the first protocol, no conversion is required for the first command. At procedure 668, the processing module 156 sends the command (which may be the converted second command, or the first command when no conversion is required) to the selected IoT device 130 using the corresponding API through the corresponding network under the corresponding protocol.

Referring to FIG. 6C, when the gateway device 120 receives a first signal directed to the control device 110 from a designated IoT device 130, at procedure 670, the processing module 156 retrieves the configuration data of the designated IoT device 130 from the data store 158. At procedure 675, the processing module 156 selects a corresponding API specific for the designated IoT device 130, and determines the corresponding protocol as well as the corresponding network for the designated IoT device 130. At procedure 680, the processing module 156 determines whether corresponding protocol for the designated IoT device 130 is different from the first protocol. If the corresponding protocol for the designated IoT device 130 is different from the first protocol, at procedure 685, the processing module 156 may convert the first signal to a second signal transmittable under the first protocol. If the corresponding protocol for the designated IoT device 130 is identical to the first protocol, no conversion is required for the first signal. At procedure 690, the processing module 156 sends the signal (which may be the converted second signal, or the first signal when no conversion is required) to the control device 110 through the first network 140 under the first protocol.

In a further aspect, the present disclosure is related to a non-transitory computer readable medium storing computer executable code. The computer executable code, when executed at one or more processor, may perform the method as described above. In certain embodiments, the non-transitory computer readable medium may include, but not limited to, any physical or virtual storage media. In certain embodiments, the non-transitory computer readable medium may be implemented as the storage device 128 of the gateway device 120 as shown in FIGS. 1 and 2B.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
    a control device; and
    a gateway device communicatively connected to the control device through a first network under a first protocol, and communicatively connected to a plurality of authenticated internet of things (IoT) devices, wherein each of the authenticated IoT devices is communicatively connected to the gateway device through a corresponding network under a corresponding protocol;
    wherein the gateway device comprises a processor and a storage device storing computer executable code, wherein the computer executable code, when executed at the processor, is configured to:
        receive, from the control device through the first network under the first protocol, a first command directed to a selected IoT device of the plurality of authenticated IoT devices;
        select, from a plurality of application program interfaces (APIs), a corresponding API specific for the selected IoT device, and determine the corresponding network and the corresponding protocol for the selected IoT device;
        when the corresponding protocol for the selected IoT device is different from the first protocol, convert the first command to a second command transmittable under the corresponding protocol for the selected IoT device, and send the second command to the selected IoT device using the corresponding API through the corresponding network under the corresponding protocol;
        when the corresponding protocol for the selected IoT device is identical to the first protocol, send the first command, without converting the first command, to the selected IoT device using the corresponding API through the corresponding network under the corresponding protocol;
        in response to discovery of a new IoT device, generate an notification corresponding to the new IoT device being discovered, and send the notification to the control device through the first network under the first protocol;
        receive, from the control device through the first network under the first protocol, an approval command to approve authentication of the new IoT device being discovered, or a rejection command to reject authentication of the new IoT device being discovered; and
        in response to receiving the approval command to approve authentication of the new IoT device being discovered, store information of the corresponding API, the corresponding network and the corresponding protocol specific for the new IoT device being discovered in the data store as the configuration data of the new IoT device being discovered, and authenticate the new IoT device being discovered to become one of the authenticated IoT devices;
    wherein the control device is a mobile device storing an IoT control application which, when executed at a processor of the mobile device, is configured to:
        provide a user interface to display information of the authenticated IoT devices;
        receive, through the user interface, a first input to identify one of the authenticated IoT devices as the selected IoT device;
        receive, through the user interface, a second input corresponding to the selected IoT device to identify an action for the selected IoT device to perform;
        in response to receiving the second input corresponding to the selected IoT device, generate, based on the second input, the first command directed to the selected IoT device; and
        send the first command to the gateway device through the first network under the first protocol.

2. The system as claimed in claim 1, wherein the computer executable code comprises:
    a data store storing information of the control device, configuration data of the authenticated IoT devices and the plurality of APIs, wherein the information of the control device comprises information of the first network and the first protocol specific for the control device, and for each of the authenticated IoT devices, the configuration data comprises the corresponding API, the corresponding network and the corresponding protocol specific for the authenticated IoT device; and
    a processing module, configured to:
        receive, from the control device through the first network under the first protocol, the first command directed to the selected IoT device;
        retrieve, based on the first command, the configuration data of the selected IoT device from the data store;
        based on the configuration data of the selected IoT device, select, from the APIs, the corresponding API specific for the selected IoT device, and determine the corresponding network and the corresponding protocol for the selected IoT device;
        when the corresponding protocol for the selected IoT device is different from the first protocol, convert the first command to the second command, and send the second command to the selected IoT device using the corresponding API through the corresponding network under the corresponding protocol; and
        when the corresponding protocol for the selected IoT device is identical to the first protocol, send the first command, without converting the first command, to the selected IoT device using the corresponding API through the corresponding network under the corresponding protocol.

3. The system as claimed in claim 2, wherein the processing module is further configured to:
receive, from a designated IoT device of the authenticated IoT devices, a first signal directed to the control device through the corresponding network under the corresponding protocol for the designated IoT device;
retrieve, based on the first signal, the configuration data of the designated IoT device from the data store;
select, based on the configuration data of the designated IoT device, the corresponding API specific for the designated IoT device from the APIs stored in the data store, and process the first signal by the corresponding API specific for the designated IoT device;
convert the first signal to a second signal transmittable under the first protocol; and
send the second signal to the control device through the first network under the first protocol.

4. The system as claimed in claim 3, wherein the IoT control application, when executed at the processor of the mobile device, is further configured to:
receive the second signal from the gateway device; and
display, based on the second signal, information corresponding to the designated IoT device on the user interface.

5. The system as claimed in claim 3, wherein the first signal is a response signal in response to a command being sent from the gateway device to the designated IoT device.

6. The system as claimed in claim 2, wherein the computer executable code further comprises:
a discovery module configured to perform at least one discovery operation for available IoT devices; and
an authentication module configured to:
in response to discovery of the new IoT device, generate the notification corresponding to the new IoT device being discovered, and send the notification to the control device through the first network under the first protocol;
receive, from the control device through the first network under the first protocol, the approval command to approve authentication of the new IoT device being discovered, or the rejection command to reject authentication of the new IoT device being discovered; and
in response to receiving the approval command to approve authentication of the new IoT device being discovered, store the information of the corresponding API, the corresponding network and the corresponding protocol specific for the new IoT device being discovered in the data store as the configuration data of the new IoT device being discovered, and authenticate the new IoT device being discovered.

7. The system as claimed in claim 6, wherein the IoT control application, when executed at the processor of the mobile device, is further configured to:
receive the notification corresponding to the new IoT device being discovered from the gateway device;
display, based on the notification, information corresponding to the new IoT device being discovered on the user interface; and
in response to receiving an input corresponding to the new IoT device to approve or reject the authentication of the new IoT device being discovered, generate, based on the input, the approval command or the rejection command, and send the approval command or the rejection command to the gateway device.

8. The system as claimed in claim 1, wherein the gateway device further comprises a plurality of network interfaces, wherein each of the network interfaces is operational under one of the first protocol or the corresponding protocols for the authenticated IoT devices.

9. The system as claimed in claim 1, wherein the first network is a Wi-Fi network.

10. A method for controlling heterogeneous internet of things (IoT) devices from a control device, the method comprising:
providing a gateway device communicatively connected to the control device through a first network under a first protocol, and communicatively connected to a plurality of authenticated IoT devices, wherein each of the authenticated IoT devices is communicatively connected to the gateway device through a corresponding network under a corresponding protocol;
receiving, at the gateway device, a first command from the control device through the first network under the first protocol, wherein the first command is directed to a selected IoT device of the authenticated IoT devices;
selecting, at the gateway device, a corresponding application program interface (API) specific for the selected IoT device from a plurality of APIs, and determining the corresponding network and the corresponding protocol for the selected IoT device;
when the corresponding protocol for the selected IoT device is different from the first protocol, converting, by the gateway device, the first command to a second command transmittable under the corresponding protocol for the selected IoT device, and sending the second command from the gateway device to the selected IoT device using the corresponding API through the corresponding network under the corresponding protocol;
when the corresponding protocol for the selected IoT device is identical to the first protocol, sending the first command, without converting the first command, from the gateway device to the selected IoT device using the corresponding API through the corresponding network under the corresponding protocol;
in response to discovery of a new IoT device, generating, by the gateway device, a notification corresponding to the new IoT device being discovered, and sending the notification from the gateway device to the control device through the first network under the first protocol;
receiving, by the gateway device, an approval command to approve authentication of the new IoT device being discovered, or a rejection command to reject authentication of the new IoT device being discovered from the control device through the first network under the first protocol; and
in response to receiving the approval command to approve authentication of the new IoT device being discovered, storing information of the corresponding API, the corresponding network and the corresponding protocol specific for the new IoT device being discovered in a data store as configuration data of the new IoT device being discovered, and authenticating the new IoT device being discovered to become one of the authenticated IoT devices;
wherein the control device is a mobile device storing an IoT control application which, when executed at a processor of the mobile device, is configured to:

provide a user interface to display information of the authenticated IoT devices;

receive, through the user interface, a first input to identify one of the authenticated IoT devices as the selected IoT device;

receive, through the user interface, a second input corresponding to the selected IoT device to identify an action for the selected IoT device to perform;

in response to receiving the second input corresponding to the selected IoT device, generate, based on the second input, the first command directed to the selected IoT device; and send the first command to the gateway device through the first network under the first protocol.

11. The method as claimed in claim 10, further comprising:

receiving, at the gateway device, a first signal from a designated IoT device of the authenticated IoT devices through the corresponding network under the corresponding protocol for the designated IoT device, wherein the first signal is directed to the control device;

retrieving, by the gateway device based on the first signal, configuration data of the designated IoT device from a data store;

selecting, by the gateway device based on the configuration data of the designated IoT device, the corresponding API specific for the designated IoT device from the APIs stored in the data store, and processing the first signal by the corresponding API specific for the designated IoT device;

converting, by the gateway device, the first signal to a second signal transmittable under the first protocol; and sending the second signal from the gateway device to the control device through the first network under the first protocol.

12. The method as claimed in claim 11, wherein the IoT control application, when executed at the processor of the mobile device, is further configured to:

receive the second signal from the gateway device; and display, based on the second signal, information corresponding to the designated IoT device on the user interface.

13. The method as claimed in claim 10, further comprising:

performing, by the gateway device, at least one discovery operation for available IoT devices.

14. The method as claimed in claim 10, wherein the IoT control application, when executed at the processor of the mobile device, is further configured to:

receive the notification corresponding to the new IoT device being discovered from the gateway device;

display, based on the notification, information corresponding to the new IoT device being discovered on the user interface; and in response to receiving an input corresponding to the new IoT device to approve or reject the authentication of the new IoT device being discovered, generate, based on the input, the approval command or the rejection command, and send the approval command or the rejection command to the gateway device.

15. A non-transitory computer readable medium storing computer executable code, wherein the computer executable code, when executed at a processor of a gateway device, is configured to:

receive, from a control device through a first network under a first protocol, a first command directed to a selected internet of things (IoT) device of a plurality of authenticated IoT devices, wherein the gateway device is communicatively connected to the control device through the first network under the first protocol, and communicatively connected to the plurality of authenticated IoT devices, wherein each of the authenticated IoT devices is communicatively connected to the gateway device through the corresponding network under the corresponding protocol;

select, from a plurality of application program interfaces (APIs), a corresponding API specific for the selected IoT device, and determine the corresponding network and the corresponding protocol for the selected IoT device;

when the corresponding protocol for the selected IoT device is different from the first protocol, convert the first command to a second command transmittable under the corresponding protocol for the selected IoT device, and send the second command to the selected IoT device using the corresponding API through the corresponding network under the corresponding protocol;

when the corresponding protocol for the selected IoT device is identical to the first protocol, send the first command, without converting the first command, to the selected IoT device using the corresponding API through the corresponding network under the corresponding protocol;

in response to discovery of a new IoT device, generate an notification corresponding to the new IoT device being discovered, and send the notification to the control device through the first network under the first protocol;

receive, from the control device through the first network under the first protocol, an approval command to approve authentication of the new IoT device being discovered, or a rejection command to reject authentication of the new IoT device being discovered; and in response to receiving the approval command to approve authentication of the new IoT device being discovered, store information of the corresponding API, the corresponding network and the corresponding protocol specific for the new IoT device being discovered in the data store as the configuration data of the new IoT device being discovered, and authenticate the new IoT device being discovered to become one of the authenticated IoT devices;

wherein the control device is a mobile device storing an IoT control application which, when executed at a processor of the mobile device, is configured to:

provide a user interface to display information of the authenticated IoT devices;

receive, through the user interface, a first input to identify one of the authenticated IoT devices as the selected IoT device;

receive, through the user interface, a second input corresponding to the selected IoT device to identify an action for the selected IoT device to perform;

in response to receiving the second input corresponding to the selected IoT device, generate, based on the second input, the first command directed to the selected IoT device; and send the first command to the gateway device through the first network under the first protocol.

16. The non-transitory computer readable medium as claimed in claim 15, wherein the computer executable code comprises:

a data store storing information of the control device, configuration data of the authenticated IoT devices and the plurality of APIs, wherein the information of the control device comprises information of the first network and the first protocol specific for the control device, and for each of the authenticated IoT devices, the configuration data comprises the corresponding API, the corresponding network and the corresponding protocol specific for the authenticated IoT device; and a processing module, configured to:
  receive, from the control device through the first network under the first protocol, the first command directed to the selected IoT device;
  retrieve, based on the first command, the configuration data of the selected IoT device from the data store;
  based on the configuration data of the selected IoT device, select, from the APIs, the corresponding API specific for the selected IoT device, and determine the corresponding network and the corresponding protocol for the selected IoT device;
  when the corresponding protocol for the selected IoT device is different from the first protocol, convert the first command to the second command, and send the second command to the selected IoT device using the corresponding API through the corresponding network under the corresponding protocol; and
  when the corresponding protocol for the selected IoT device is identical to the first protocol, send the first command, without converting the first command, to the selected IoT device using the corresponding API through the corresponding network under the corresponding protocol.

17. The non-transitory computer readable medium as claimed in claim 16, wherein the processing module is further configured to:
  receive, from a designated IoT device of the authenticated IoT devices, a first signal directed to the control device through the corresponding network under the corresponding protocol for the designated IoT device;
  retrieve, based on the first signal, the configuration data of the designated IoT device from the data store;
  select, based on the configuration data of the designated IoT device, the corresponding API specific for the designated IoT device from the APIs stored in the data store, and process the first signal by the corresponding API specific for the designated IoT device;
  convert the first signal to a second signal transmittable under the first protocol; and
  send the second signal to the control device through the first network under the first protocol.

18. The non-transitory computer readable medium as claimed in claim 17, wherein the IoT control application, when executed at the processor of the mobile device, is further configured to:

receive the second signal from the gateway device; and
  display, based on the second signal, information corresponding to the designated IoT device on the user interface.

19. The non-transitory computer readable medium as claimed in claim 17, wherein the first signal is a response signal in response to a command being sent from the gateway device to the designated IoT device.

20. The non-transitory computer readable medium as claimed in claim 16, wherein the computer executable code further comprises:
  a discovery module configured to perform at least one discovery operation for available IoT devices; and
  an authentication module configured to:
    in response to discovery of the new IoT device, generate the notification corresponding to the new IoT device being discovered, and send the notification to the control device through the first network under the first protocol;
    receive, from the control device through the first network under the first protocol, the approval command to approve authentication of the new IoT device being discovered, or the rejection command to reject authentication of the new IoT device being discovered; and
    in response to receiving the approval command to approve authentication of the new IoT device being discovered, store the information of the corresponding API, the corresponding network and the corresponding protocol specific for the new IoT device being discovered in the data store as the configuration data of the new IoT device being discovered, and authenticate the new IoT device being discovered.

21. The non-transitory computer readable medium as claimed in claim 20, wherein the IoT control application, when executed at the processor of the mobile device, is further configured to:
  receive the notification corresponding to the new IoT device being discovered from the gateway device;
  display, based on the notification, information corresponding to the new IoT device being discovered on the user interface; and
  in response to receiving an input corresponding to the new IoT device to approve or reject the authentication of the new IoT device being discovered, generate, based on the input, the approval command or the rejection command, and send the approval command or the rejection command to the gateway device.

* * * * *